July 26, 1932.   C. T. ELDREDGE   1,868,597
SIGHTOMETER
Filed Aug. 2, 1928
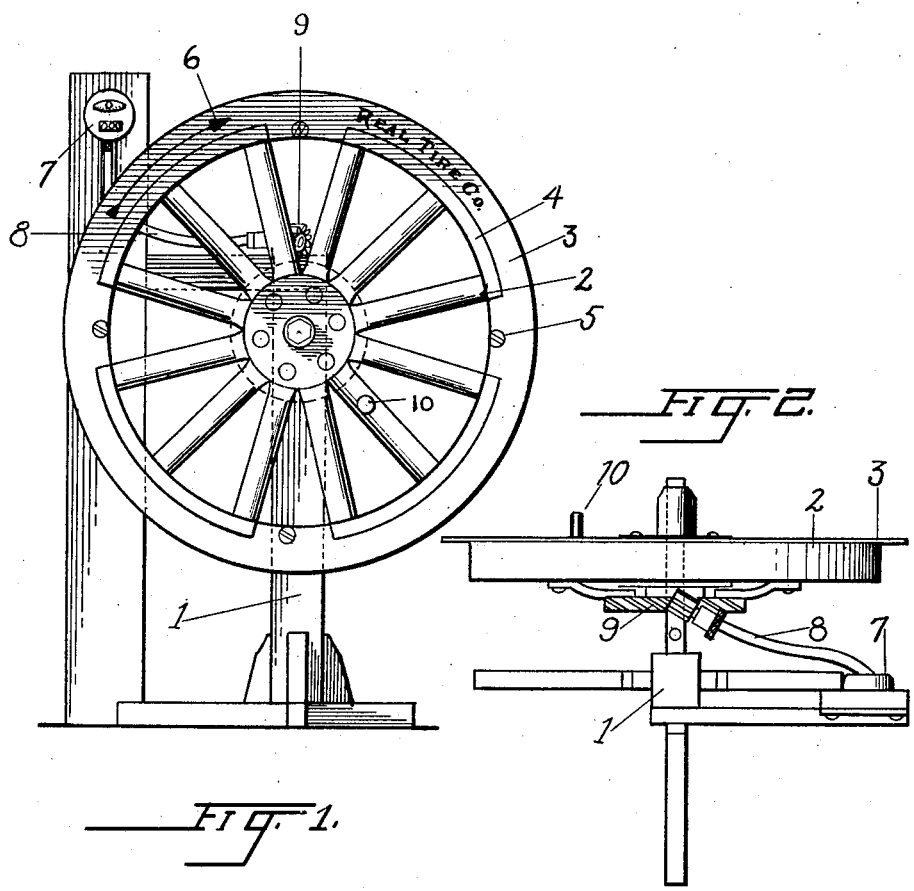
INVENTOR.
CLYDE T. ELDREDGE
BY Munn &Co
ATTORNEYS.

Patented July 26, 1932

1,868,597

UNITED STATES PATENT OFFICE

CLYDE T. ELDREDGE, OF MILL VALLEY, CALIFORNIA

SIGHTOMETER

Application filed August 2, 1928. Serial No. 297,084.

My invention relates to improvements in sightometers, and it consists in the combinations, constructions and arrangements hereinafter described and claimed.

An object of my invention is to provide some graphical means of showing at what speed an object apparently starts to disappear. To accomplish this, I have mounted an object upon a wheel and have connected this wheel with a speed-indicating device so that a turning of the wheel will register on the device the speed of the moving rim. The object is placed upon the rim, and therefore a disappearance of the object at a certain speed indicated by the speed-measuring device will inform the operator at what speed an object has to be moved before it apparently starts to disappear.

Other objects and advantages will appear as the specification proceeds, and the novel features will be particularly pointed out in what I hereinafter claim.

My invention is illustrated in the accompanying drawing forming a part of this application, in which Figure 1 is a side elevation of the device, and Figure 2 is a top plan view of the device.

In carrying out my invention, I provide a supporting standard 1, and on this I mount a wheel indicated at 2. The wheel carries a circular cardboard 3 or metal sheet which represents a tire, and this is secured to the rim 4 of the wheel by screws 5. An arrow 6 or other object is printed upon the cardboard.

The wheel is connected to a speedometer 7 by the usual flexible cable 8 and gearing 9. The wheel may be turned by a motor, or it may be turned by hand. I have provided a handle 10 for this purpose.

From the foregoing description of the various parts of the device, the operation thereof may be readily understood.

A person stands in front of the device and rapidly rotates the wheel by means of the handle 10. The speedometer 7 registers the speed in miles per hour of the arrow 6. The operator watches the arrow and tells the person who is watching the speedometer when the arrow starts to disappear. The person then checks the speed indicated by the speedometer, and this is the speed at which the moving object becomes obscured. Of course, the person operating the wheel can quickly glance at the speedometer the instant the arrow 6 starts to disappear, and in this way can dispense with the services of another person.

Although I have shown and described one embodiment of my invention, it is to be understood that the same is susceptible of various changes, and I reserve the right to employ such changes as may come within the scope of the invention as claimed.

I claim:

A sightometer comprising a frame, a fully exposed wheel rotatably carried by the frame, one sighting object disposed at the rim of the wheel, and a speed indicating device operatively connected to the wheel for showing the speed of rim travel of the wheel and therefore the speed of the moving object, whereby the speed at which the object starts to lose its outline to an observer can be ascertained.

CLYDE T. ELDREDGE.